E. FAIRWEATHER.
VARIABLE GEAR POWER TRANSMISSION APPARATUS.
APPLICATION FILED MAR. 19, 1918.

1,285,964.

Patented Nov. 26, 1918.
2 SHEETS—SHEET 2.

Witnesses
Grace P. Brereton

Inventor
Edgar Fairweather
By Sturtevant & Mason
Attorneys

UNITED STATES PATENT OFFICE.

EDGAR FAIRWEATHER, OF LONDON, ENGLAND.

VARIABLE-GEAR POWER-TRANSMISSION APPARATUS.

1,285,964.　　　　　Specification of Letters Patent.　　Patented Nov. 26, 1918.

Application filed March 19, 1918. Serial No. 223,433.

*To all whom it may concern:*

Be it known that I, EDGAR FAIRWEATHER, a subject of the King of Great Britain, residing at London, in the county of Middlesex and Kingdom of England, have invented certain new and useful Improvements in and Relating to Variable-Gear Power-Transmission Apparatus, of which the following is a specification.

The present invention relates to improvements in variable ratio transmission gearing, of the type in which one or more of the gear wheels transmitting the drive are slidable axially into or out of driving connection with other pinions.

The improvement of the present invention is therefore applicable to that type of variable ratio pinion transmission gearing in which the driving and the driven shafts for instance are co-axial and the drive is transmitted through a lay shaft having pinions movable into and out of engagement with pinions on the driving or driven shaft. Or again the invention may also be applied to transmission gearing of the type where, instead of sliding the actual driving member, such as the pinion, connection and disconnection of the drive are effected through clutches, usually dogs.

According to the present invention, the member displaceable axially for the purpose of interrupting or engaging the drive, be it either a special member such as a dog having four or more teeth or a pinion having a larger number of teeth, is carried on a shaft which engages it by means of a surface which is truly axial at such places opposite to the position of engagement of the drive but is twisted helically intermediate such position to give to the clutch member a negative or positive acceleration to increase its actual peripheral velocity in the case where a clutch member, such as the dog or pinion, engaging the drive is about to come into engagement with a similar dog or pinion moving at an increased velocity to the peripheral velocity of the clutch, dog or pinion, under its previous conditions of rotation, or similarly, of course, to decrease its actual peripheral velocity where the clutch member has to rotate at a lower speed under the previous conditions governing it.

That is to say that the helical portion of dog or pinion upon the supporting shaft extends only partially along the said supporting shaft.

The helical interconnection may be in the form of a squared shaft or of other cross-section twisted about its axis for certain portions of its length only, or again may be in the form of helical cam slot or thread on the supporting-shaft which from time to time extends into parts which lie truly parallel to the axis of the shaft.

The invention is more particularly described with reference to the accompanying drawings, in which:—

Figure 1:
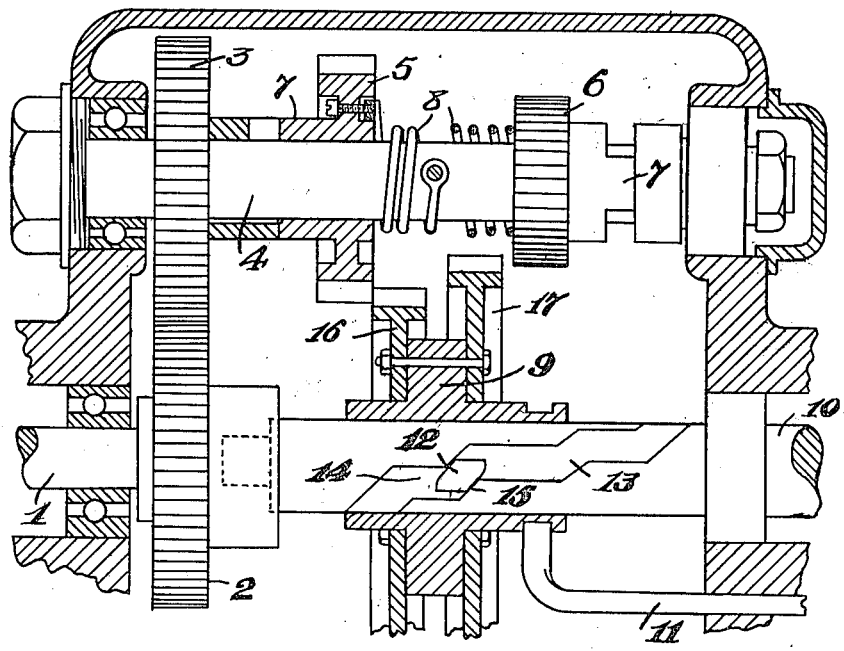
Figure 1 is a sectional elevation of a gear-box for use, for instance, with automobile engines.

The driving shaft 1 carries a pinion 2 in constant mesh with the pinion 3 on a lay shaft 4, which lay shaft has loosely mounted upon it a pair of pinions 5, 6, adapted to be connected to the shaft 4 by dogs 7, being held in position so that the dogs 7 on the pinions 5, 6 will lie midway between the dogs on the shaft 4, these being secured by means of the springs 8 in a manner according to my prior U. S. Patent application Serial No. 202,752. This arrangement is not essential to the invention, but provides a very effective transmission arrangement when combined with it.

The member 9 displaceable for the purpose of altering the ratio of transmission of drive from the driving shaft 1 to the driven shaft 10, is displaceable along said shaft by the usual gear-striking lever 11 and carries a pin 12 engaging with a helical groove 13 cut in the shaft 10, which has parts 14 upon it which are truly axial to the shaft 10, these parts being connected by the helical parts 13. The effect of this is that when the gear wheel 16 is in engagement with the gear wheel 5, the pin 12 is lying in the space 14 and consequently there is no tendency for the gearing to come out of engagement. As the member 9, however, is displaced by means of a lever 11 to bring the gear wheel 16 out of engagement with the gear wheel 5, it is given a negative movement of precession to reduce its peripheral velocity so that the peripheral velocity of the wheel 17 is also reduced to approximate better the peripheral velocity of the pinion 6 with which it is about to engage a further movement of the striking lever 11.

Figure 2:
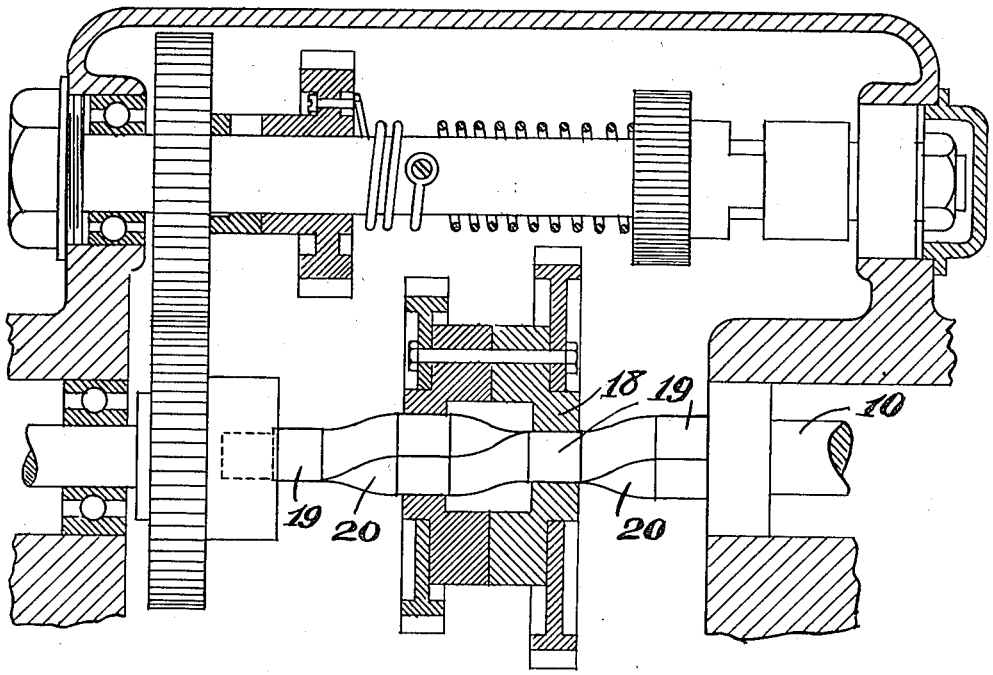
Fig. 2 is a corresponding view of a modification.

If an upstanding thread were used the sleeve would be shaped accordingly instead of a pin (as in Fig. 2 which really amounts to four upstanding threads).

When the gear wheel 17 is fully in mesh with the wheel 6, the pin 12 has connection with the part 14 of the pathway or guide which is truly axial to the shaft 10.

Figure 3:
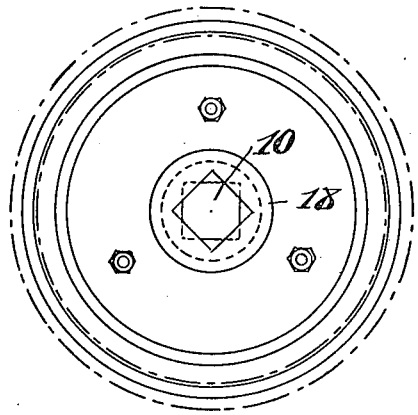
Fig. 3 is a partial end view of Fig. 2.

The modification of this arrangement is shown in Figs. 2 and 3, where the driven shaft 10 is squared in cross-section (Fig. 3) and engages the usual sleeve 18 on which the gear wheels displaceable for changing the transmission of drive are mounted. This shaft 10 has parts 19 truly parallel to the axis of the shaft 10 corresponding to the positions of engagement of one or other of the gear wheels on a sleeve 18 and has helical flutings 20 or in another aspect, combined grooves and upstanding threads to impart a negative or positive movement of precession to the sleeve 18 as it moves out of either of the positions of engagement. When the toothed wheels are in mesh the members 18 rest wholly upon the parallel portion 19 of the shaft.

I declare that what I claim is:—

1. A variable ratio transmission gearing comprising a shaft, gear wheels on said shaft, a second shaft having sides parallel to its axis at portions opposite the gear wheels on said first shaft, pinions sliding axially on said second shaft and means to impart an acceleration to it when moving axially, between the position of engagement with the pinions on first shaft only.

2. A variable ratio transmission gearing comprising a pair of shafts, gear wheels on said shafts, means to displace gear wheels axially along shaft to alter the speed of drive transmission and a helical connection between said gear wheel and its shaft at places intermediate the positions of engagement only.

3. A variable ratio transmission gearing comprising a shaft, a gear guide having continuous parallel and inclined guide portions, gears on said shaft, a parallel shaft, gear wheels keyed thereon at places opposite said axial guideway portions, gears displaceable along and engaging with said gear guide, a power transmitting means connected to one shaft, and a driven member connected to the other shaft so that as the gears are displaced along the guide they are accelerated or retarded in peripheral velocity to suit the relative peripheral speed of the gear with which they are about to engage.

4. A variable ratio transmission gearing comprising a shaft of irregular cross section twisted about its axis at spaced distances along its length only, a second shaft parallel thereto, gear wheels on said second shaft keyed thereon in equivalent spaced relationship with said untwisted portions, gear wheels on said first shaft engaging said twisted portions between the positions of its engagement with the gear wheels on the second shaft to have an acceleration imparted to it.

5. A variable ratio transmission gearing comprising a shaft of square cross section twisted about its axis at spaced distances along its length only, a second shaft parallel thereto, gear wheels on said second shaft keyed thereon in equivalent spaced relationship with said untwisted portions, and gear wheels on said first shaft engaging said twisted portions between the positions of its engagement with the gear wheels on the second shaft to have an acceleration imparted to it.

6. A variable ratio transmission gearing comprising a shaft, gear wheels loose on said shaft, dogs between said gear wheels and said shaft allowing almost a complete rotation on said shaft, a spring tending to hold each gear wheel in a mid position between the two end positions of engagement with the shaft, a second shaft having sides parallel to its axis at portions in equivalent spaced relationship with the gear wheels on said first shaft, a pinion sliding axially on said second shaft and means to impart an acceleration to it when moving axially only between its positions of engagement with the pinions on first shaft.

In witness whereof I have hereunto signed my name this 25th day of February, 1918, in the presence of two subscribing witnesses.

EDGAR FAIRWEATHER.

Witnesses:
 GEORGE MERCY SKELSEY,
 ERNEST HENRY ROBERTS.